United States Patent
Okuike (10) Patent No.: US 12,165,402 B2
(45) Date of Patent: Dec. 10, 2024

(54) IMAGE RECOGNITION DEVICE AND IMAGE RECOGNITION METHOD

(71) Applicant: Sony Semiconductor Solutions Corporation, Kanagawa (JP)

(72) Inventor: Kazuyuki Okuike, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 422 days.

(21) Appl. No.: 17/604,552

(22) PCT Filed: May 29, 2020

(86) PCT No.: PCT/JP2020/021493
§ 371 (c)(1),
(2) Date: Oct. 18, 2021

(87) PCT Pub. No.: WO2020/246401
PCT Pub. Date: Dec. 10, 2020

(65) Prior Publication Data
US 2022/0198791 A1    Jun. 23, 2022

(30) Foreign Application Priority Data

Jun. 5, 2019 (JP) .................................. 2019-105645

(51) Int. Cl.
G06K 9/00 (2022.01)
G06T 7/90 (2017.01)
G06V 10/88 (2022.01)

(52) U.S. Cl.
CPC ................ *G06V 10/88* (2022.01); *G06T 7/90* (2017.01); *G06T 2207/10024* (2013.01); *G06T 2207/10048* (2013.01)

(58) Field of Classification Search
CPC . G06V 10/88; G06T 7/90; G06T 2207/10024; G06T 2207/10048
See application file for complete search history.

(56) References Cited

U.S. PATENT DOCUMENTS 7,113,651 B2 * 9/2006 Liang ..................... G02B 21/02
                                                                382/284
9,898,117 B2 * 2/2018 Sargent ............... G06F 3/04883
(Continued)

FOREIGN PATENT DOCUMENTS

JP        2007-4721 A    1/2007
JP     2013-164834 A    8/2013
(Continued)

OTHER PUBLICATIONS

Singh, Hari Kumar, Shiv Kumar Tomar, and Prashant Kumar Maurya. "Thresholding Techniques applied for Segmentation of RGB and multispectral images." Proceedings published by International Journal of Computer Applications®(IJCA) ISSN (2012): 0975-8887. (Year: 2012).*

(Continued)

*Primary Examiner* — Avinash Yentrapati
(74) *Attorney, Agent, or Firm* — Michael Best & Friedrich LLP (57) ABSTRACT

Provided are an image recognition device and an image recognition method capable of improving subject recognition accuracy. The image recognition device (image sensor 1) according to the present disclosure includes an imaging unit (10) and a recognition unit (14). The imaging unit (10) generates image data by capturing a plurality of images in different wavelength bands using imaging pixels (R, G, B, IR) receiving light in four or more types of wavelength bands. The recognition unit (14) recognizes a subject from each of the plurality of pieces of image data for each of the wavelength bands.

13 Claims, 9 Drawing Sheets

(56) References Cited

U.S. PATENT DOCUMENTS

| | | | | |
|---|---|---|---|---|
| 2004/0096118 | A1* | 5/2004 | Liang | G02B 21/02 |
| | | | | 382/284 |
| 2004/0213459 | A1* | 10/2004 | Ishimaru | G06T 17/05 |
| | | | | 382/191 |
| 2014/0321753 | A1* | 10/2014 | Roux | G06V 20/13 |
| | | | | 382/191 |
| 2015/0381909 | A1* | 12/2015 | Butte | A61B 1/0669 |
| | | | | 250/578.1 |
| 2019/0026873 | A1* | 1/2019 | Luciano | H04N 9/3185 |
| 2019/0139256 | A1 | 5/2019 | Kim | |
| 2019/0159681 | A1* | 5/2019 | Sugaya | A01K 29/00 |
| 2019/0370586 | A1* | 12/2019 | Otsuki | G06F 18/214 |
| 2021/0158108 | A1* | 5/2021 | Ando | G06V 20/56 |

FOREIGN PATENT DOCUMENTS

| | | |
|---|---|---|
| JP | 2015-194884 A | 11/2015 |
| JP | 2016-032289 A | 3/2016 |
| JP | 2017-52498 A | 3/2017 |
| JP | 2018-189558 A | 11/2018 |

OTHER PUBLICATIONS

Aggarwal, Hemant Kumar, Angshul Majumdar, and Rabab Ward. "A Reconstruction Algorithm for Multi-Spectral Image Demosaicing." Proceedings of IASTED International Conference on Signal and Image, Banff, AL, Canada. vol. 1719. 2013. (Year: 2013).*

Ghassemian, Hassan. "A review of remote sensing image fusion methods." Information Fusion 32 (2016): 75-89. (Year: 2016).*

Perazzi, Federico, et al. "Learning video object segmentation from static images." Proceedings of the IEEE conference on computer vision and pattern recognition. 2017. (Year: 2017).*

International Search Report (PCT/ISA/210), International Application No. PCT/JP2020/021493, dated Jul. 28, 2020.

* cited by examiner

IMAGE RECOGNITION DEVICE AND IMAGE RECOGNITION METHOD

FIELD

The present disclosure relates to an image recognition device and an image recognition method.

BACKGROUND

There is a device generating a multispectral image by capturing a plurality of images in different wavelength bands and synthesizing data on the images captured for the respective wavelengths using imaging pixels receiving light in four or more types of wavelength bands (for example, see Patent Literature 1). The multispectral image is used, for example, for recognizing a subject that is difficult to recognize with naked eyes, estimating a property of the subject, and the like.

CITATION LIST

Patent Literature

Patent Literature 1: JP 2016-032289 A

SUMMARY

Technical Problem

However, in the above-described conventional art, subject recognition accuracy may deteriorate. At this point, the present disclosure proposes an image recognition device and an image recognition method capable of improving subject recognition accuracy.

Solution to Problem

The image recognition device according to the present disclosure includes an imaging unit and a recognition unit. The imaging unit generates image data by capturing a plurality of images in different wavelength bands using imaging pixels receiving light in four or more types of wavelength bands. The recognition unit recognizes a subject from each of the plurality of pieces of image data for each of the wavelength bands.

DESCRIPTION OF EMBODIMENTS

Hereinafter, embodiments of the present disclosure will be described in detail with reference to the drawings. Note that, in the following embodiments, the same parts are denoted by the same reference signs, and overlapping description will be omitted.

[1. First Embodiment]
[1-1. Outline of Image Recognition Method According to First Embodiment]

Figure 1:
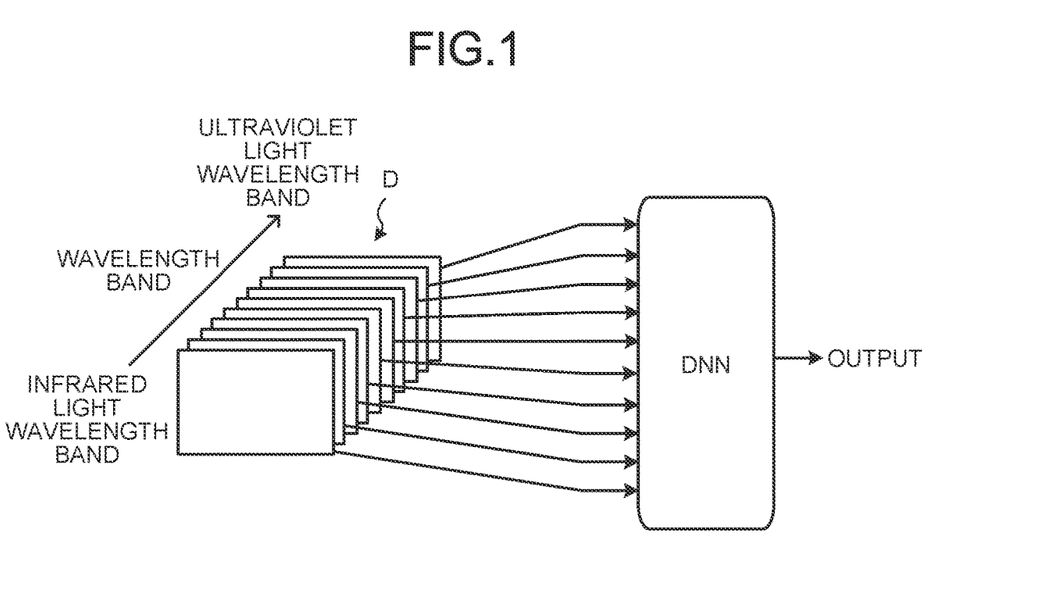
FIG. 1 is an explanatory diagram illustrating an outline of an image recognition method according to a first embodiment of the present disclosure.

First, an outline of an image recognition method according to the present disclosure will be described. FIG. 1 is an explanatory diagram illustrating an outline of an image recognition method according to a first embodiment of the present disclosure.

In the image recognition method according to the present disclosure, image data D is generated by capturing a plurality of images in different wavelength bands, for example, from an infrared light wavelength band to an ultraviolet light wavelength band as illustrated in FIG. 1, using imaging pixels receiving light in four or more types of wavelength bands.

A multispectral image can be generated by synthesizing a plurality of pieces of image data D for different wavelength bands. However, the synthesized multispectral image may include an artifact that does not actually exist.

For this reason, in a case where a subject is recognized from the synthesized multispectral image, subject recognition accuracy may deteriorate due to the influence of the artifact. However, each piece of image data D for each wavelength band before the synthesis does not include an artifact. At this point, in the image recognition method according to the present disclosure, the subject is recognized from each piece of image data D for each wavelength band.

Here, as an example of a method of recognizing the subject from the image data D, there is an image recognition method using a deep neural network (DNN). The DNN is an algorithm having a multi-level structure which is designed for modeling a human cranial nerve circuit (neural network) by machine learning to recognize a feature (pattern) of a subject from image data.

In the image recognition method according to the present disclosure, a plurality of pieces of image data D for different wavelength bands are input to the DNN. Then, the DNN outputs a recognition result for the subject recognized from the image data D for each wavelength band.

In the image recognition method according to the present disclosure, since the subject is recognized by inputting to the DNN each of the plurality of pieces of image data D for different wavelength bands with no artifact as described above, subject recognition accuracy can be improved.

[1-2. Configuration of Image Recognition System According to First Embodiment]

Figure 2:
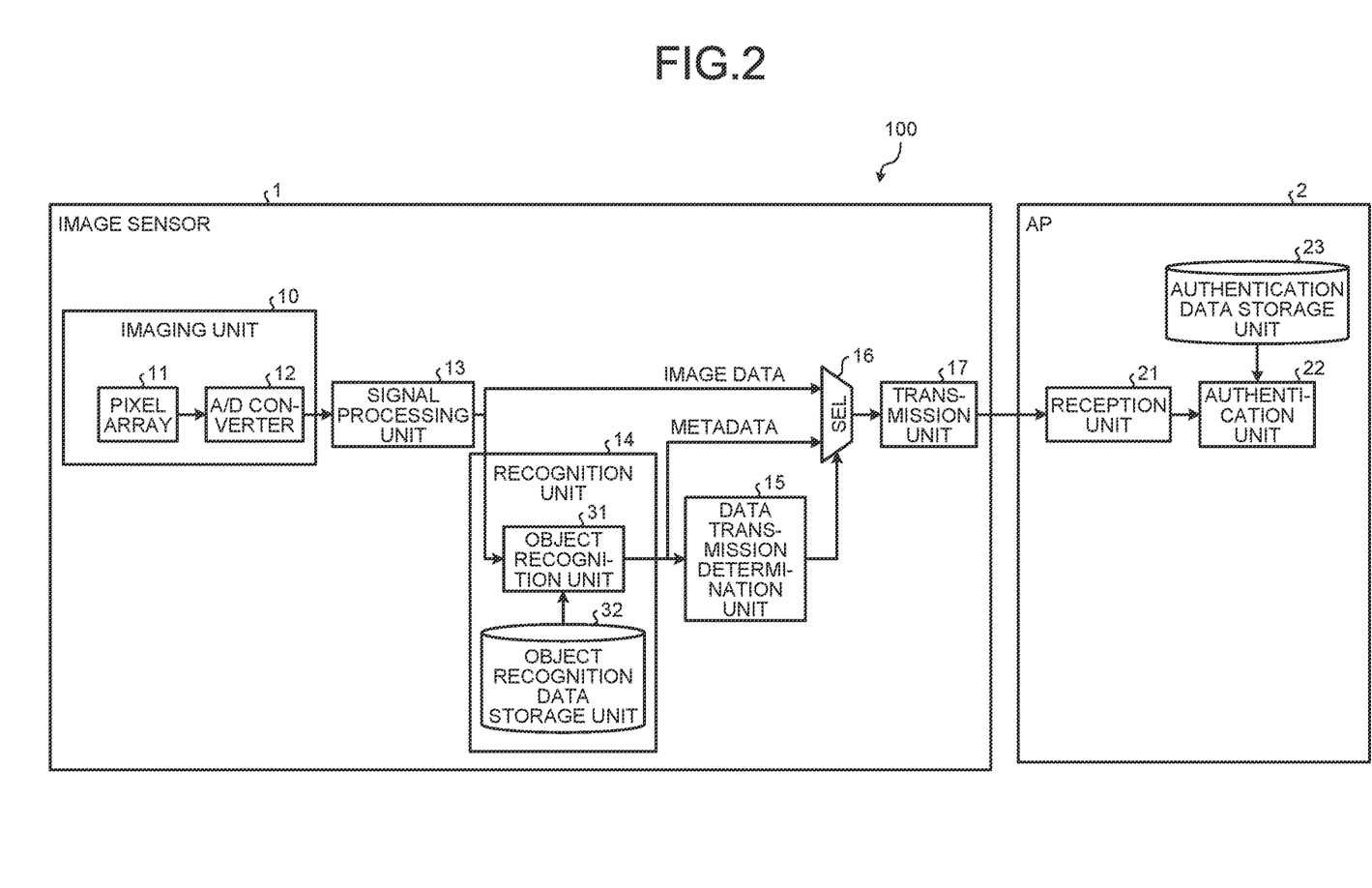
FIG. 2 is a diagram illustrating a configuration example of an image recognition system according to the first embodiment of the present disclosure.

Next, a configuration of an image recognition system according to the first embodiment will be described with reference to FIG. 2. FIG. 2 is a diagram illustrating a configuration example of an image recognition system according to the first embodiment of the present disclosure. As illustrated in FIG. 2, an image recognition system 100 according to the first embodiment includes an image sensor 1 as an example of an image recognition device and an application processor (hereinafter, referred to as the AP 2).

The image sensor 1 includes an imaging unit 10, a signal processing unit 13, a recognition unit 14, a data transmission determination unit 15, a selector (hereinafter, referred to as the SEL 16), and a transmission unit 17. The imaging unit 10 includes a pixel array 11 and an analog/digital (A/D) converter 12.

The pixel array 11 includes a plurality of imaging pixels receiving light in four or more types of wavelength bands and arranged in a two-dimensional manner, and captures a plurality of images in different wavelength bands, for example, from an infrared light wavelength band to an ultraviolet light wavelength band, depending on the imaging pixels. Then, the pixel array 11 outputs an analog pixel signal corresponding to a light reception amount from each of the imaging pixels to the A/D converter 12. The A/D converter 12 A/D-converts the analog pixel signal input from the pixel array 11 into a digital pixel signal to generate image data, and outputs the image data to the signal processing unit 13.

The signal processing unit 13 includes a microcomputer and various circuits, the microcomputer including a central processing unit (CPU), a read only memory (ROM), a random access memory (RAM), and the like.

The signal processing unit 13 executes predetermined signal processing on the image data input from the A/D converter 12, and outputs the signal-processed image data of the image to the recognition unit 14 and the SEL 16. Here, a flow of the processing executed by the signal processing unit 13 will be described with reference to FIG. 3.

Figure 3:
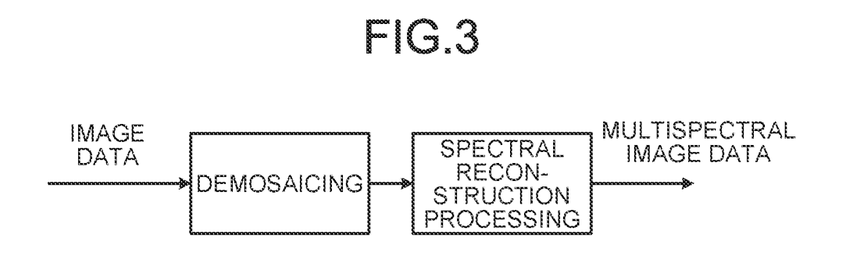
FIG. 3 is a diagram for explaining processing executed by a signal processing unit according to the first embodiment of the present disclosure.

FIG. 3 is a diagram for explaining the processing executed by the signal processing unit according to the first embodiment of the present disclosure. As illustrated in FIG. 3, the signal processing unit 13 generates multispectral image data by performing spectral reconstruction processing after performing demosaicing with respect to the input image data, and outputs the multispectral image data to the recognition unit 11 and the SEL 16.

Here, the multispectral image data output to the recognition unit 11 and the SEL 16 are respective pieces of image data for four or more types of wavelength bands, and are a plurality of pieces of image data D before being synthesized as illustrated in FIG. 1.

Returning to FIG. 2, the recognition unit 14 includes a microcomputer and various circuits, the microcomputer including a CPU, a ROM, a RAN, and the like. The recognition unit 14 includes an object recognition unit. 31 functioning when the CPU executes an object recognition program stored in the ROM using the RAN as a work area, and an object recognition data storage unit 32 provided in the RAM or the ROM. The object recognition data storage unit 32 stores a plurality of DNNs for respective types of objects to be recognized.

The object recognition unit 31 reads out a DNN corresponding to a set type of object to be recognized from the object recognition data storage unit 32. Then, the object recognition unit 31 inputs the image data to the DNN, and outputs a subject recognition result output from the DNN to the data transmission determination unit 15 and outputs metadata of the recognition result to the SEL 16.

Figure 4:
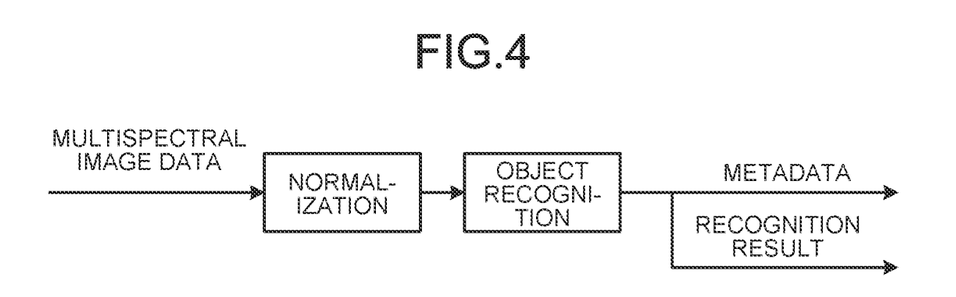
FIG. 4 is a diagram for explaining processing executed by a recognition unit according to the first embodiment of the present disclosure.
Figure 5:
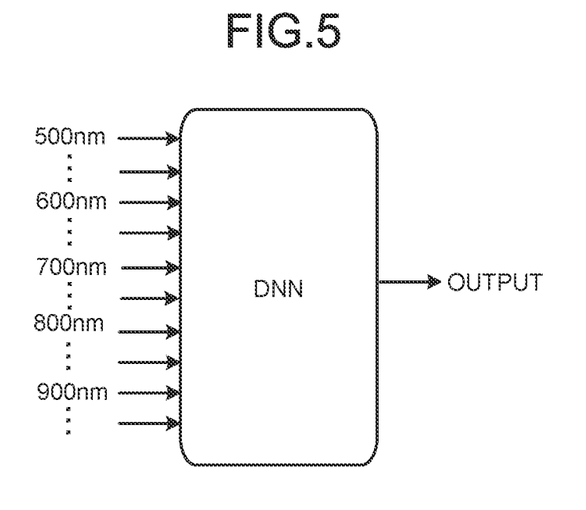
FIG. 5 is a diagram for explaining the processing executed by the recognition unit according to the first embodiment of the present disclosure.

Here, a flow of the processing performed by the recognition unit 1-1 will be described with reference to FIGS. 4 and 5. FIGS. 4 and 5 are diagrams for explaining the processing executed by the recognition unit according to the first embodiment of the present disclosure. As illustrated in FIG. 4, first of all, the recognition unit 11 normalizes sizes and input values of the input multispectral image data in accordance with the size and the input value for DNN, and inputs the normalized image data to the DNN to perform object recognition.

At this time, as illustrated in FIG. 5, the recognition unit 11 inputs a plurality of (e.g., 10) pieces of image data for different wavelength bands, for example, 500 nm, 600 nm, 700 nm, 800 nm, and 900 nm, to the DNN. Then, the recognition unit 14 outputs a subject recognition result output from the DNN for each piece of image data to the data transmission determination unit 15, and outputs metadata of the recognition result to the SEL 16.

As described above, since the recognition unit 14 inputs a plurality of pieces of image data for different wavelength bands with no artifact to the DNN, the subject is recognized from each piece of image data, the subject can be recognized with high accuracy without being influenced by an artifact.

Returning to FIG. 2, the data transmission determination unit 15 outputs to the SEL 16 a control signal for switching data to be output from the SEL 16 according to the recognition result input from the recognition unit 14. When the subject is recognized by the recognition unit 14, the data transmission determination unit 15 outputs to the SEL 16 a control signal for outputting the image data and the metadata indicating the recognition result to the transmission unit 17.

In addition, when the subject is not recognized by the recognition unit 14, the data transmission determination unit 15 outputs to the SEL 16 a control signal for outputting information indicating the recognition result (no data) to the transmission unit 17. The SEL 16 outputs either a set of the image data and the metadata or no data to the transmission unit 17 according to the control signal input from the data transmission determination unit 15.

The transmission unit 17, which is a communication interface (I/F) performing data communication with the AP 2, transmits either the set of the image data and the metadata or the no data input from the SEL 16 to the AP 2.

The AP 2 includes a microcomputer and various circuits, the microcomputer including a CPU, a ROM, a RAM, and the like to execute various application programs according to what the image recognition system 100 is used for. The AP 2 includes a reception unit 21, an authentication unit 22, and an authentication data storage unit 23.

The authentication data storage unit 23 stores an authentication program, authentication image data, and the like for authenticating the subject recognized by the image sensor 1. The reception unit 21 is a communication I/F performing data communication with the image sensor 1. The reception unit 21 receives either the set of the image data and the metadata or the no data from the image sensor 1 and outputs the received one to the authentication unit 22.

The authentication unit 22 is not activated when the no data is input thereto from the reception unit 21, but is activated when the set of the image data and the metadata is input thereto from the reception unit 21. When activated, the authentication unit 22 reads out the authentication program from the authentication data storage unit 23 and executes the authentication program to authenticate the subject recognized by the image sensor 1.

For example, in a case where the set of the metadata indicating that the subject is a person and the image data is input, the authentication unit 22 performs processing or the like for collating the image data with person authentication image data and identifying who the recognized person is.

At this time, the authentication unit 22 can accurately identify who the recognized person is because the person is identified on the basis of the image data in which the subject is recognized as a person by the image sensor 1 with high accuracy without being influenced by an artifact. Note that the first embodiment described above is an example, and various modifications can be made.

Figure 6:
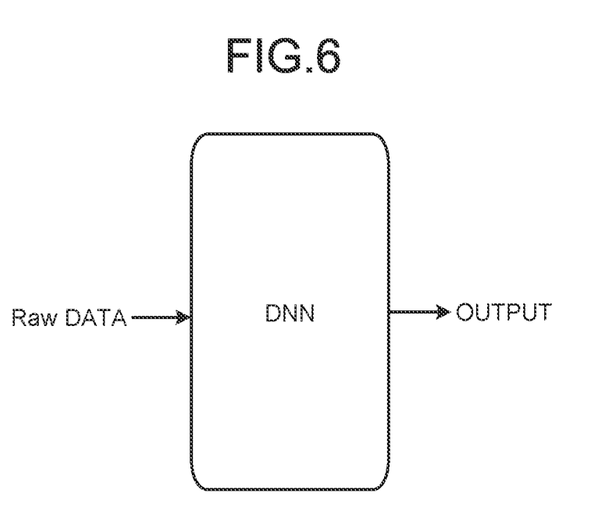
FIG. 6 is a diagram for explaining an operation of the recognition unit in a case where the signal processing unit according to the first embodiment of the present disclosure is omitted.

For example, the signal processing unit 13 illustrated in FIG. 2 can be omitted from the image sensor 1. FIG. 6 is a diagram for explaining an operation of the recognition unit 14 in a case where the signal processing unit according to the first embodiment of the present disclosure is omitted. As illustrated in FIG. 6, in the case where the signal processing unit 13 is omitted, the recognition unit 14 inputs the image data output from the imaging unit 10 as raw data to the DNN.

In this case, the recognition unit 14 performs the DNN processing on the image data for a larger number of types of wavelength bands than the Image data subjected to the spectral reconstruction processing by the signal processing unit 13, causing an increase in processing load. However, since the subject is recognized from more pieces of image data, the subject recognition accuracy can be further improved.

[2. Image Sensor According to Second Embodiment]

Next, an image sensor according to a second embodiment will be described. In the image sensor according to the second embodiment, operations of the signal processing unit 13 and the recognition unit 14 are different from those in the first embodiment, and the other configurations are the same as those in the first embodiment.

Figure 7:
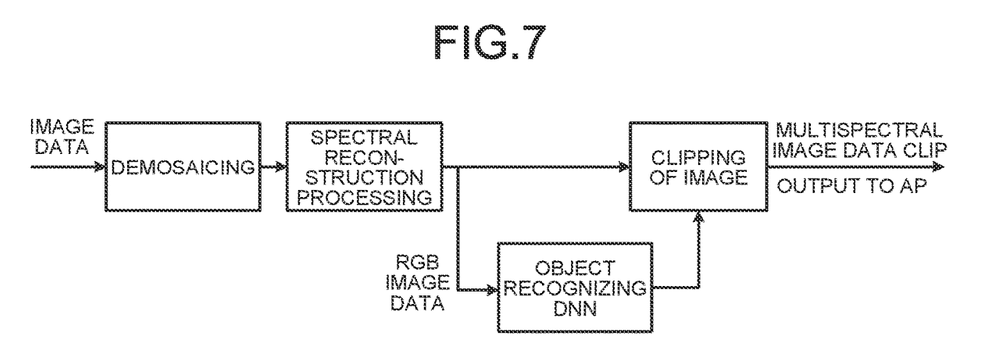
FIG. 7 is a diagram for explaining operations of a signal processing unit and a recognition unit according to a second embodiment of the present disclosure.

Thus, here, the operations of the signal processing unit 13 and the recognition unit 14 according to the second embodiment will be described, and overlapping description will be omitted concerning the other configurations. FIG. 7 is a diagram for explaining the operations of the signal processing unit and the recognition unit according to the second embodiment of the present disclosure.

As illustrated in FIG. 7, in the second embodiment, the signal processing unit 13 generates a plurality of pieces of multispectral image data for different wavelength bands by performing spectral reconstruction processing after performing demosaicing with respect to the image data input from the imaging unit 10.

Thereafter, the signal processing unit 13 selectively outputs RGB image data for three primary colors, i.e., red light (R), green light (G), and blue light (B), among the plurality of pieces of multispectral image data generated, to the recognition unit 14.

The recognition unit 14 inputs the RGB images input from the signal processing unit 13 to an object recognizing DNN, and recognizes a subject from each piece of the RGB image data. Accordingly, the recognition unit 14 can have a reduced processing load as compared with that in the case where the subject is recognized from all of the image data generated by the signal processing unit 13.

Note that, although it has been described here that the recognition unit 14 recognizes the subject from the RGB image data, the recognition unit 14 may recognize the subject from all of the multispectral image data generated by the signal processing unit 13. Then, although there is an increase in processing amount, the recognition unit 14 can recognize the subject more accurately by that amount.

Thereafter, the recognition unit 14 outputs multispectral image data clips obtained by clipping portions in which the subject is recognized out of the plurality of pieces of multispectral image data to the AP 2 in a subsequent stage. Note that, in a case where the signal processing unit 13 is omitted, the recognition unit 14 outputs image data clips obtained by clipping portions in which the subject is recognized out of the image data (raw data) generated by the imaging unit 10 to the AP 2.

As described above, the image sensor according to the second embodiment outputs the image data clips obtained by clipping the portions in which the subject is recognized out of the captured image data to the AP 2. Accordingly for example, when the plurality of pieces of image data input from the image sensor 1 are synthesized, the AP 2 only needs to synthesize partial image data clipped by the image sensor 1, which results in a decrease in processing load.

[3. Image Sensor According to Third Embodiment]

Next, an image sensor according co a third embodiment will be described. In the image sensor according to the third embodiment, operations of the imaging unit 10, the signal processing unit 13, and the recognition unit 14 are different from those in the first embodiment, and the other configurations are the same as those in the first embodiment.

Figure 8:
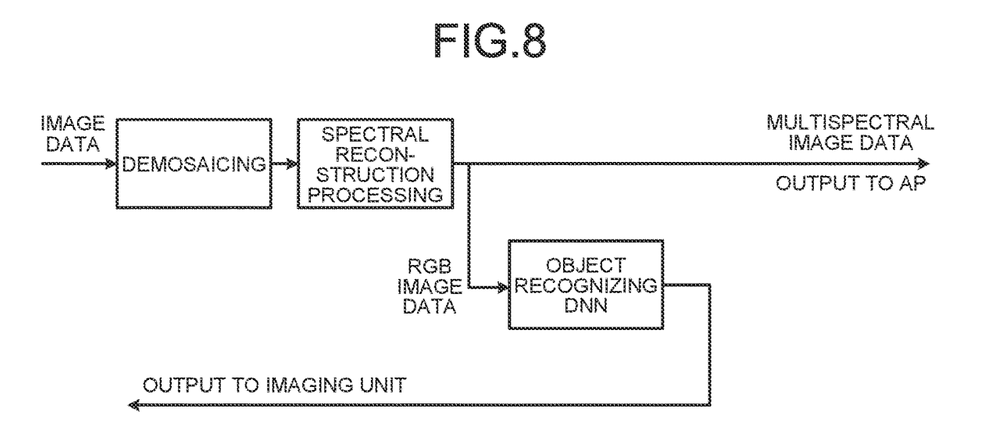
FIG. 8 is a diagram for explaining operations of an imaging unit, a signal processing unit, and a recognition unit according to a third embodiment of the present disclosure.

Thus, here, the operations of the imaging unit 10, the signal processing unit 13, and the recognition unit 14 according to the third embodiment will be described, and overlapping description will be omitted concerning the other configurations. FIG. 8 is a diagram for explaining the operations of the imaging unit, the signal processing unit, and the recognition unit according to the third embodiment of the present disclosure.

As illustrated in FIG. 8, in the third embodiment, the signal processing unit 13 generates a plurality of pieces of multispectral image data for different wavelength bands by performing spectral reconstruction processing after performing demosaicing with respect to the image data input from the imaging unit 10. Thereafter, the signal processing unit 13 selectively outputs RGB image data, among the plurality of pieces of multispectral image data generated, to the recognition unit 14.

The recognition unit 14 inputs the RGB images input from the signal processing unit 13 to an object recognizing DNN, and recognizes a subject from each piece of the RGB image data. Accordingly, the recognition unit. 14 can have a reduced processing load as compared with that in the case where the subject is recognized from all of the image data generated by the signal processing unit 13.

Note that, although it has been described here that the recognition unit 14 recognizes the subject from the RGB image data, the recognition unit 14 may recognize the subject from all of the multispectral image data generated by the signal processing unit 13. Then, although there is an increase in processing amount, the recognition unit 14 can recognize the subject more accurately by that amount.

Thereafter, the recognition unit 14 outputs information indicating positions at which the subject is recognized in the RGB image data to the imaging unit 10.

The imaging unit 10 outputs image data clips obtained by clipping, out of current-frame image data, portions corresponding to portions in which the subject is recognized by the recognition unit 14 in previous-frame RGB image data to the signal processing unit 13. The signal processing unit 13 performs demosaicing and spectral reconstruction processing with respect to the image data clips input from the imaging unit 10 by clipping the portions in which the subject is recognized, and outputs the processed image data clips to the AP 2 in a subsequent stage.

Accordingly, the signal processing unit 13 can have a reduced processing load because an amount of calculation required for the demosaicing and the spectral reconstruction processing is reduced. Furthermore, when the plurality of pieces of image data input from the image sensor 1 are synthesized, the AP 2 only needs to synthesize partial image data clipped by the imaging unit 10, which results in a decrease in processing load.

Note that, in a case where the signal processing unit 13 is omitted, the recognition unit 14 recognizes a subject from the image data (raw data) generated by the imaging unit 10, and outputs information indicating positions at which the subject is recognized in the image data to the imaging unit 10.

The imaging unit 10 outputs image data clips obtained by clipping, out of current-frame image data, portions corresponding to portions in which the subject is recognized by the recognition unit 14 in previous-frame image data (raw data) to the AP 2 in a subsequent stage.

As described above, the image sensor according to the third embodiment outputs the image data clips obtained by clipping the portions in which the subject is recognized out of the captured image data to the AP 2. Accordingly, even in a case where the signal processing unit 13 is omitted, the AP 2 only needs to synthesize partial image data clipped by the imaging unit 10, which results in a decrease in processing load.

[4. Image Sensor According to Fourth Embodiment]

Next, an image sensor according to a fourth embodiment will be described. In the image sensor according to the fourth embodiment, data output to the AP 2 and operations of the signal processing unit 13 and the recognition unit 14 are different from those in the first embodiment, and the other configurations are the same as those in the first embodiment.

Figure 9:
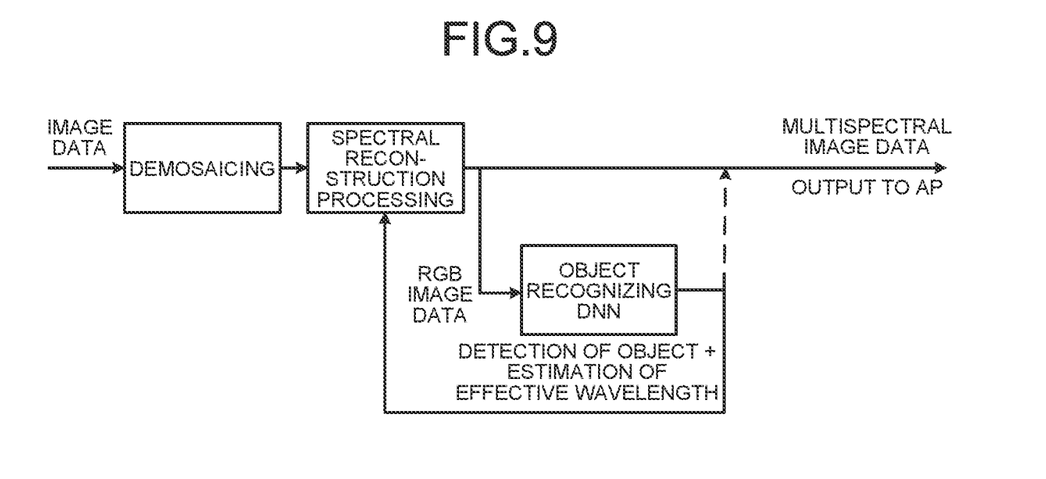
FIG. 9 is a diagram for explaining operations of a signal processing unit and a recognition unit according to a fourth embodiment of the present disclosure.
Figure 10:
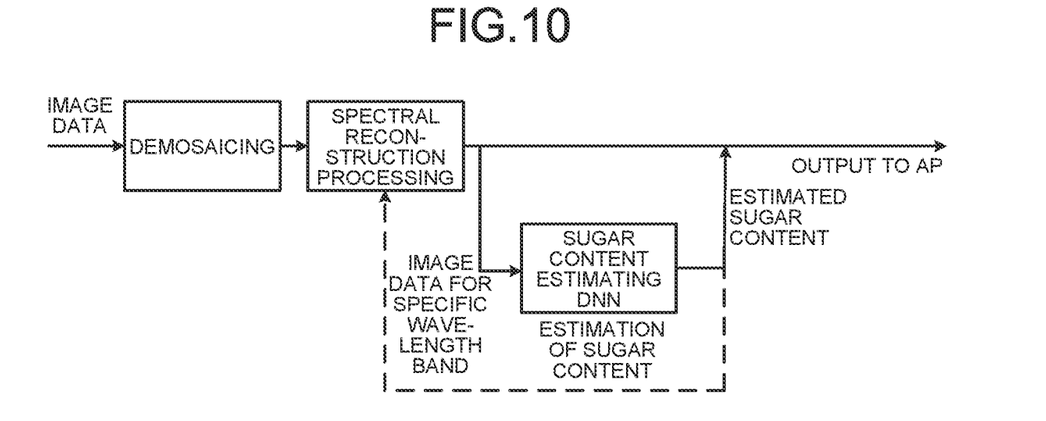
FIG. 10 is a diagram for explaining the operations of the signal processing unit and the recognition unit according to the fourth embodiment of the present disclosure.

Thus, here, the operations of the signal processing unit 13 and the recognition unit 14 according to the fourth embodiment will be described, and overlapping description will be omitted concerning the other configurations. FIGS. 9 and 10 are diagrams for explaining the operations of the signal processing unit and the recognition unit according to the fourth embodiment of the present disclosure.

The image sensor according to the fourth embodiment estimates a sugar content of a fruit as a subject, for example, as an example of a property of the subject, from a plurality of pieces of image data for four or more different types of wavelength bands, and outputs the estimated sugar content to the AP 2. Specifically, as illustrated in FIG. 9, the signal processing unit 13 first generates a plurality of pieces of image data for different wavelength bands by performing spectral reconstruction processing after performing demosaicing with respect to the image data input from the imaging unit 10.

Thereafter, the signal processing unit 13 selectively outputs RGB image data, among the plurality of pieces of image data generated, to the recognition unit 14. The recognition unit 14 inputs the RGB image data input from the signal processing unit 13 to an object recognizing DNN, and recognizes a subject from each piece of the RGB image data. Accordingly, the recognition unit 14 can have a reduced processing load as compared with that in the case where the subject is recognized from all of the image data generated by the signal processing unit 13.

Further, the recognition unit 14 estimates an effective wavelength corresponding to the subject recognized from the RGB image data. For example, the recognition unit 14 estimates a specific wavelength band with which the sugar content of the fruit as the subject can be estimated as the effective wavelength. Then, the recognition unit 14 outputs the estimated effective wavelength to the signal processing unit 13.

As illustrated in FIG. 10, the signal processing unit 13 outputs to the recognition unit 14 image data for the specific wavelength band (specific wavelength band image data) corresponding to the effective wavelength input from the recognition unit 14 from a next frame period. The recognition unit 14 inputs the specific wavelength band image data input from the signal processing unit 13 to a sugar content estimating DNN, and outputs estimated sugar content of the fruit as the subject output from the sugar content estimating DNN to the AP 2.

As described above, since the image sensor according to the fourth embodiment estimates the sugar content of the fruit from the specific wavelength band image data, a processing load can be reduced as compared with that in the case where the sugar content is estimated from all of the multispectral image data generated by the signal processing unit 13.

[5. Image Sensor According to Fifth Embodiment]

Next, an image sensor according to a fifth embodiment will be described. In the image sensor according to the fifth embodiment, a configuration of the pixel array, an imaging operation, and an object recognizing operation are different from those in the first embodiment, and the other configurations are the same as those in the first embodiment.

Figure 11:
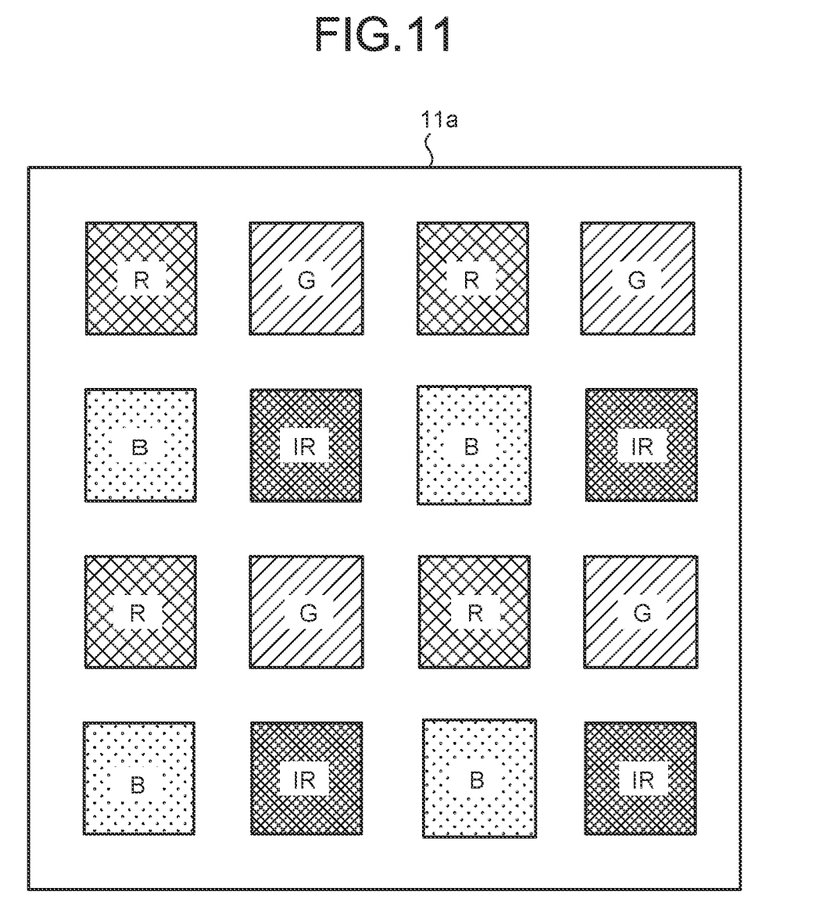
FIG. 11 is an explanatory diagram illustrating a pixel array according to a fifth embodiment of the present disclosure.

Thus, here, the configuration of the pixel array, the imaging operation, and the object recognizing operation according to the fifth embodiment will be described, and overlapping description will be omitted concerning the other configurations. FIG. 11 is an explanatory diagram illustrating the pixel array according to the fifth embodiment of the present disclosure. FIGS. 12 to 15 are diagrams for explaining operations of the image sensor according to the fifth embodiment of the present disclosure.

As illustrated in FIG. 11, a pixel array 11a according to the fifth embodiment includes imaging pixels R receiving red light, imaging pixels G receiving green light, imaging pixels B receiving blue light, and imaging pixels IR receiving infrared light.

In an example illustrated in FIG. 11, in the pixel array 11a, imaging lines in which the imaging pixels R and the imaging pixels G are alternately arranged and imaging lines in which the imaging pixels B and the Imaging pixels IR are alternately arranged are alternately arranged in a two-dimensional manner.

The pixel array 11*a* can capture RGB images of three primary colors and an infrared ray (IR) image. Examples of a method of capturing an IR image include a method in which a subject is irradiated with infrared light and the imaging pixel IR receives the infrared light reflected by the subject to capture an image, and a method in which the imaging pixel IR receives infrared light included in natural light to capture an image.

In a case where the image sensor employs the method in which infrared light is irradiated, the image sensor includes a light emitting unit irradiating the subject with infrared light. In such a configuration, when the imaging pixels R, G, and B and the imaging pixel IR are exposed simultaneously, images are captured by the imaging pixels R, G, and B in an environment where the infrared light is irradiated. As a result, the image sensor cannot capture an image of the subject in an original color.

Figure 12:
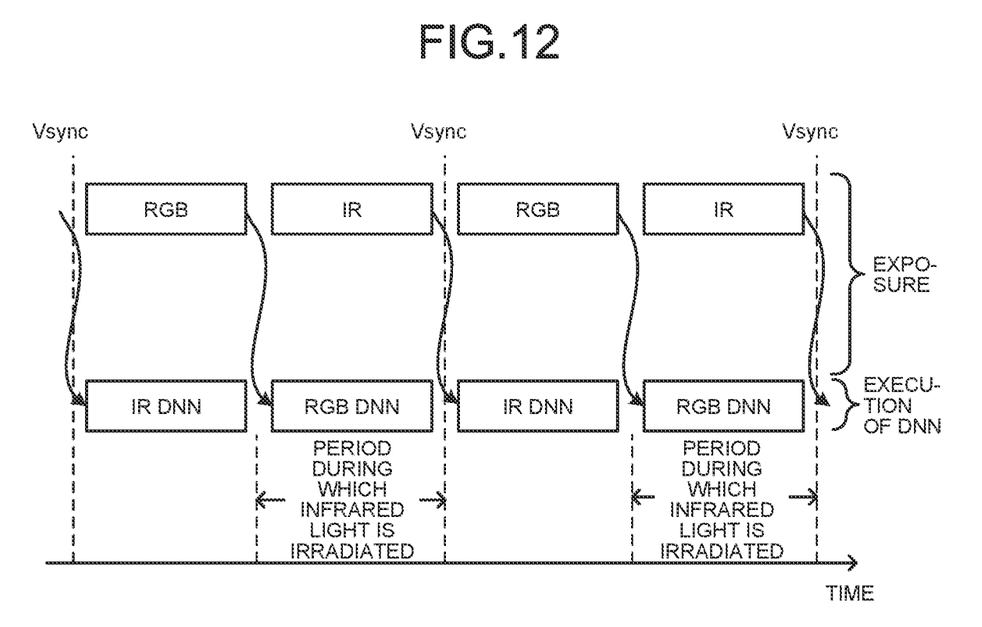
FIG. 12 is a diagram for explaining an operation of an image sensor according to the fifth embodiment of the present disclosure.

At this point, as illustrated in FIG. 12, in the image sensor according to the fifth embodiment, infrared light is intermittently irradiated by the light emitting unit. Then, within one frame period corresponding to one cycle of Vsync (vertical synchronization signal), the imaging unit 10 captures images in visible light wavelength bands by exposing the imaging pixels R, G, and B for a period during which infrared light is not irradiated, and captures an image in an infrared light wavelength band by exposing the imaging pixel IR for a period during which infrared light is irradiated.

Accordingly, since infrared light is not irradiated for a period during which the imaging pixels R, G, and B are exposed, the imaging pixels R, G, and B can image the subject in an original color without being influenced by the infrared light. On the other hand, since infrared light is irradiated for a period during which the imaging pixel IR is exposed, the imaging pixel IR can reliably capture an IR image.

In addition, the recognition unit 14 executes an RGB DNN for the period during which infrared light is irradiated to recognize the subject from the image data for the visible light wavelength bands. Also, the recognition unit 14 executes an IR DNN for the period during which infrared light is not irradiated to recognize the subject from the image data for the infrared light wavelength band.

Figure 13:
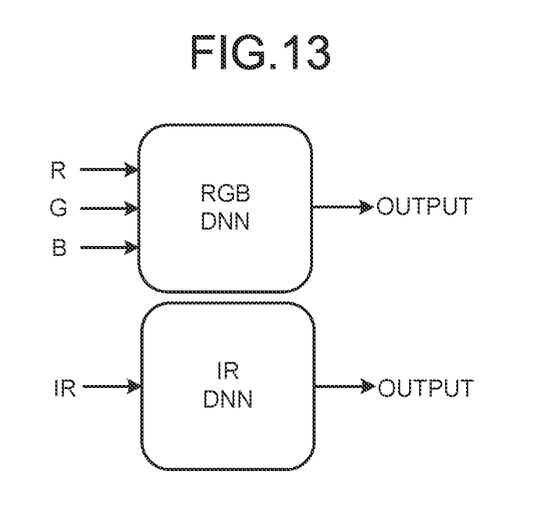
FIG. 13 is a diagram for explaining the operation of the image sensor according to the fifth embodiment of the present disclosure.

At this time, as illustrated in FIG. 13, the recognition unit 14 inputs image data captured by the imaging pixels R, G, and B to the RGB DNN, and recognizes the subject from the image data for the visible light wavelength bands. Also, the recognition unit 14 inputs image data captured by the imaging pixel IR to the IR DNN, and recognizes the subject from the image data for the infrared light wavelength band. Accordingly, the image sensor can capture RGB images and an IR image within one frame period, and recognize a subject from both the RGB images and the IR image.

Figure 14:
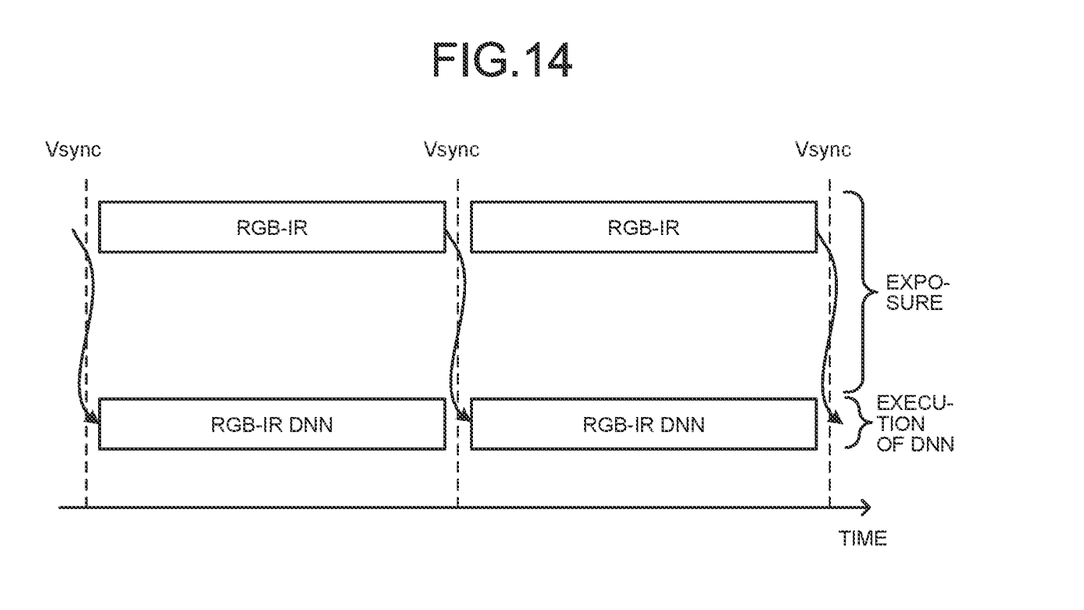
FIG. 14 is a diagram for explaining the operation of the image sensor according to the fifth embodiment of the present disclosure.

In addition, as illustrated in FIG. 14, in a case where the image sensor according to the fifth embodiment employs the method in which the imaging pixel IR receives infrared light included in natural light to capture an image, the imaging unit 10 exposes the imaging pixels R, G, and B and the imaging pixel IR simultaneously.

Accordingly, the imaging unit 10 can simultaneously capture RGB images in the visible light wavelength bands and an IR image in the infrared light wavelength band. Then, the recognition unit 14 executes an RGB-IR DNN within one frame period to recognize a subject from previous-frame image data for the visible light wavelength bands and for the infrared light wavelength band within one frame period.

Figure 15:
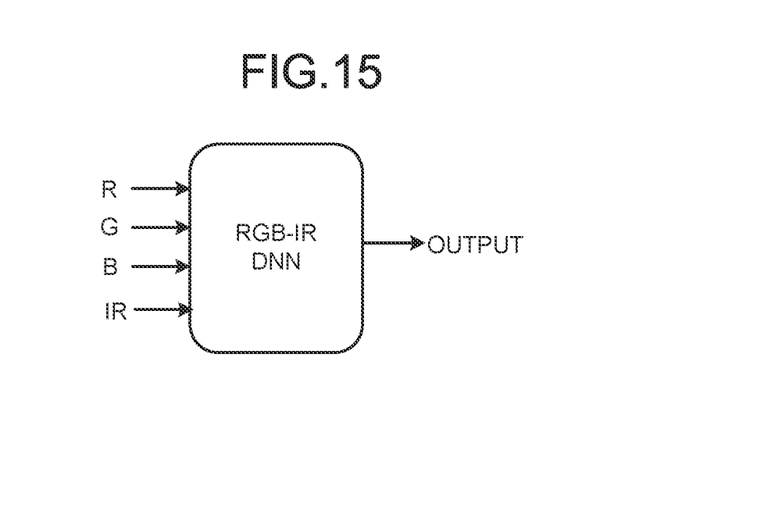
FIG. 15 is a diagram for explaining the operation of the image sensor according to the fifth embodiment of the present disclosure.

At this time, as illustrated in FIG. 15, the recognition unit 14 simultaneously inputs image data captured by the imaging pixels R, G, and B and image data captured by the imaging pixel IR to the RGB-IR DNN, Accordingly, the recognition unit 14 can recognize the subject simultaneously from the image data for the visible light wavelength bands and the image data for the infrared light wavelength band.

[6. Effects]

As an example of the image recognition device, an image sensor 1 includes an imaging unit 10 and a recognition unit 14. The imaging unit 10 captures a plurality of images in different wavelength bands, using imaging pixels receiving light in four or more types of wavelength bands, to generate image data. The recognition unit recognizes a subject from each of the plurality of pieces of image data for each of the wavelength bands.

Accordingly, the image sensor can recognize the subject without being influenced by an artifact, thereby improving subject recognition accuracy.

In addition, the recognition unit 14 outputs image data clips obtained by clipping portions in which the subject is recognized out of the image data generated by the imaging unit 10 to a subsequent-stage device. Accordingly, the image sensor 1 can reduce a processing load of the subsequent-stage device.

In addition, the imaging unit 10 outputs image data clips obtained by clipping, out of current-frame image data, portions corresponding to portions in which the subject is recognized by the recognition unit in previous-frame image data. Accordingly, the image sensor 1 can reduce a processing load of the subsequent-stage device.

In addition, the recognition unit 14 recognizes the subject from image data for three primary color wavelength bands among the image data generated by the imaging unit 10. Accordingly, the image sensor 1 can reduce a processing load of the recognition unit 14.

In addition, the recognition unit 14 estimates a property of the subject on the basis of image data for a specific wavelength band corresponding to the subject recognized from the image data. As a result, the image sensor 1 can estimate the property of the subject while reducing a processing load of the recognition unit 14.

Further, as an example of the image recognition device, the image sensor 1 includes a signal processing unit 13 performing demosaicing and spectral reconstruction processing with respect to the image data. The recognition unit 14 recognizes the subject from the image data subjected to the demosaicing and the spectral reconstruction processing. Accordingly, the image sensor 1 can recognize the subject from the image data from which, for example, noise components have been removed by the signal processing unit 13, thereby improving subject recognition accuracy.

Furthermore, the recognition unit 14 recognizes the subject from image data (raw data) input from the imaging unit 10. Accordingly, the image sensor 1 recognizes the subject from the raw data in a larger data amount than the image data generated by the signal processing unit 13, thereby improving subject recognition accuracy.

Further, as an example of the image recognition device, the image sensor includes a light emitting unit intermittently irradiating the subject with infrared light. The imaging unit 10 captures images in visible light wavelength bands for a period during which the infrared light is not irradiated, and captures an image in an infrared light wavelength band for a period during which the infrared light is irradiated. The recognition unit 14 recognizes the subject from image data for the visible light wavelength bands during the irradiation period and recognizes the subject from image data for the infrared light wavelength band during the non-irradiation period. Accordingly, the image sensor can not only accurately recognize the subject from the image data for the visible light wavelength bands captured without being influenced by infrared light, but also capture an image in the infrared light wavelength band and recognize the subject from the infrared light image data.

Furthermore, the imaging unit 10 simultaneously captures images in visible light wavelength bands and an image in an infrared light wavelength band. In one frame period during which the images in the visible light wavelength bands and the image in the infrared light wavelength band are captured, the recognition unit 14 recognizes the subject from previous-frame image data for the visible light wavelength bands and for the infrared light wavelength band. Accordingly, the Image sensor can recognize the subject from each of the images in the visible light wavelength bands and in the infrared light wavelength band captured simultaneously within one frame period.

Also, an image recognition method includes: generating image data by capturing a plurality of images in different wavelength bands using imaging pixels receiving light in four or more types of wavelength bands; and recognizing a subject from each of the plurality of pieces of image data for each of the wavelength bands. According to such an image recognition method, subject recognition accuracy can be improved because the subject is recognized without being influenced by an artifact.

Note that the effects described in the present specification are merely examples and are not limited, and there may be other effects as well.

Note that the present technology can also have the following configurations.

(1)
An image recognition device including:
an imaging unit that generates image data by capturing a plurality of images in different wavelength bands using imaging pixels receiving light in four or more types of wavelength bands; and
a recognition unit that recognizes a subject from each of the plurality of pieces of image data for each of the wavelength bands.

(2)
The image recognition device according to (1),
wherein the recognition unit
outputs image data clips obtained by clipping portions in which the subject is recognized out of the image data generated by the imaging unit to a subsequent-stage device.

(3)
The image recognition device according to (1),
wherein the imaging unit
outputs image data clips obtained by clipping, out of current-frame image data, portions corresponding to portions in which the subject is recognized by the recognition unit in previous-frame image data.

(4)
The image recognition device according to any one of (1) to (3).
wherein the recognition unit
recognizes the subject from image data for three primary color wavelength bands among the image data generated by the imaging unit.

(5)
The image recognition device according to any one of (1) to (4),
wherein the recognition unit estimates a property of the subject on the basis of image data for a specific wavelength band corresponding to the subject recognized from the image data.

(6)
The image recognition device according to any one of (1) to (5), including
a signal processing unit that performs demosaicing and spectral reconstruction processing with respect to the image data,
wherein the recognition unit
recognizes the subject from the image data subjected to the demosaicing and the spectral reconstruction processing.

(7)
The image recognition device according to any one of (1) to (5),
wherein the recognition unit
recognizes the subject from the image data input from the imaging unit.

(8)
The image recognition device according to any one of (1) to (7), including
a light emitting unit that intermittently irradiates the subject with infrared light,
wherein the imaging unit
captures images in visible light wavelength bands for a period during which the infrared light is not irradiated, and captures an image in an infrared light wavelength band for a period during which the infrared light is irradiated, and
the recognition unit
recognizes the subject from image data for the visible light wavelength bands during the irradiation period, and recognizes the subject from image data for the infrared light wavelength band during the non-irradiation period.

(9)
The image recognition device according to any one of (1) to (7),
wherein the imaging unit
simultaneously captures images in visible light wavelength bands and an image in an infrared light wavelength band, and
the recognition unit
recognizes the subject from previous-frame image data for the visible light wavelength bands and for the infrared light wavelength band in one frame period during which the images in the visible light wavelength bands and the image in the infrared light wavelength band are captured.

(10)
An image recognition method including:
generating image data by capturing a plurality of images in different wavelength bands using imaging pixels receiving light in four or more types of wavelength bands; and
recognizing a subject from each of the plurality of pieces of image data for each of the wavelength bands.

REFERENCE SIGNS LIST

100 IMAGE RECOGNITION SYSTEM
1 IMAGE SENSOR
10 IMAGING UNIT
11, 11a PIXEL ARRAY
12 A/D CONVERTER.
13 SIGNAL PROCESSING UNIT
14 RECOGNITION UNIT
15 DATA TRANSMISSION DETERMINATION UNI
16 SEL
17 TRANSMISSION UNIT
2 AP

21 RECEPTION UNIT
22 AUTHENTICATION UNIT
23 AUTHENTICATION DATA STORAGE UNIT
31 OBJECT RECOGNITION UNIT
32 OBJECT RECOGNITION DATA STORAGE UNIT

The invention claimed is:

1. An image recognition device comprising:
a light emitting unit that intermittently irradiates a subject with infrared light,
a memory storing program code, and
a processor configured to execute the program code to perform operations comprising:
generating, by an imaging unit, pieces of image data by capturing a plurality of images in different wavelength bands using imaging pixels receiving light in four or more types of wavelength bands;
recognizing the subject from each of the pieces of image data for each of the wavelength bands;
capturing images in visible light wavelength bands for a period during which the infrared light is not irradiated;
capturing an image in an infrared light wavelength band for a period during which the infrared light is irradiated;
recognizing the subject from the pieces of image data for the visible light wavelength bands during an irradiation period;
recognizing the subject from the pieces of image data for the infrared light wavelength band during a non-irradiation period; and
outputting image data clips obtained by clipping, out of current-frame image data, portions corresponding to portions in which the subject is recognized in previous-frame image data.

2. The image recognition device according to claim 1, wherein the operations further comprise:
outputting image data clips obtained by clipping portions in which the subject is recognized out of the image data generated by the imaging unit to a subsequent-stage device.

3. The image recognition device according to claim 1, wherein the operations further comprise:
recognizing the subject from among the pieces of image data for three primary color wavelength bands.

4. The image recognition device according to claim 1, wherein the operations further comprise:
estimating a property of the subject on the basis of image data for a specific wavelength band corresponding to the subject recognized from the pieces of image data.

5. The image recognition device according to claim 1, wherein the operations further comprise:
performing demosaicing and spectral reconstruction processing with respect to the pieces of image data; and
recognizing the subject from the pieces of image data subjected to the demosaicing and the spectral reconstruction processing.

6. The image recognition device according to claim 1, wherein the operations further comprise:
recognizing the subject from the previous-frame image data for the visible light wavelength bands and for the infrared light wavelength band in one frame period during which the images in the visible light wavelength bands and the image in the infrared light wavelength band are captured.

7. An image recognition method wherein a light emitting unit intermittently irradiates a subject with infrared light, the image recognition method comprising:
generating, by an imaging unit, pieces of image data by capturing a plurality of images in different wavelength bands using imaging pixels receiving light in four or more types of wavelength bands;
recognizing a subject from each of the pieces of image data for each of the wavelength bands;
capturing images in visible light wavelength bands for a period during which the infrared light is not irradiated;
capturing an image in an infrared light wavelength band for a period during which the infrared light is irradiated;
recognizing the subject from the pieces of image data for the visible light wavelength bands during an irradiation period;
recognizing the subject from the pieces of image data for the infrared light wavelength band during a non-irradiation period; and
outputting image data clips obtained by clipping, out of current-frame image data, portions corresponding to portions in which the subject is recognized in previous-frame image data.

8. A non-transitory computer readable medium storing program code for image recognition wherein a light emitting unit intermittently irradiates a subject with infrared light, the program code being executable by a processor to perform operations comprising:
generating, by an imaging unit, pieces of image data by capturing a plurality of images in different wavelength bands using imaging pixels receiving light in four or more types of wavelength bands;
recognizing the subject from each of the pieces of image data for each of the wavelength bands;
capturing images in visible light wavelength bands for a period during which the infrared light is not irradiated;
capturing an image in an infrared light wavelength band for a period during which the infrared light is irradiated;
recognizing the subject from the pieces of image data for the visible light wavelength bands during an irradiation period;
recognizing the subject from the pieces of image data for the infrared light wavelength band during a non-irradiation period; and
outputting image data clips obtained by clipping, out of current-frame image data, portions corresponding to portions in which the subject is recognized in previous-frame image data.

9. The non-transitory computer readable medium according to claim 8, wherein the operations further comprise:
outputting image data clips obtained by clipping portions in which the subject is recognized out of the image data generated by the imaging unit to a subsequent-stage device.

10. The non-transitory computer readable medium according to claim 8, wherein the operations further comprise:
recognizing the subject from among the pieces of image data for three primary color wavelength bands.

11. The non-transitory computer readable medium according to claim 8, wherein the operations further comprise:
estimating a property of the subject on the basis of image data for a specific wavelength band corresponding to the subject recognized from the pieces of image data.

12. The non-transitory computer readable medium according to claim 8, wherein the operations further comprise:

performing demosaicing and spectral reconstruction processing with respect to the pieces of image data; and recognizing the subject from the pieces of image data subjected to the demosaicing and the spectral reconstruction processing.

13. The non-transitory computer readable medium according to claim 8, wherein the operations further comprise:

recognizing the subject from the previous-frame image data for the visible light wavelength bands and for the infrared light wavelength band in one frame period during which the images in the visible light wavelength bands and the image in the infrared light wavelength band are captured.

* * * * *